Patented Dec. 17, 1946

2,412,921

UNITED STATES PATENT OFFICE 2,412,921

INSOLUBLE HETEROPOLYMER OF A MONO-OLEFIN AND AN UNSATURATED ETHER

William J. Sparks, Cranford, and Robert M. Thomas, Union, N. J., assignors to Standard Oil Development Company, a corporation of Delaware No Drawing. Application July 9, 1943, Serial No. 494,020

8 Claims. (Cl. 260—86)

This application relates to hydrocarbon polymers; relates particularly to interpolymers or heteropolymers of an isoolefin with an olefinic ether and relates particularly to heteropolymers of isobutylene with an olefinic ether.

As is well known to those skilled in the art, it has been found possible to produce a heteropolymer of an isoolefin such as isobutylene with a conjugated diolefin such as butadien or isoprene or the like, utilizing an active metal halide, or Friedel-Crafts type catalyst dissolved in a low freezing, inert solvent. The resulting polymers have molecular weights ranging from 15,000 to 150,000 and they are reactive with sulfur in a curing reaction by which the fluidity of the polymer is modified and replaced by an elastic limit at which the material has a relatively high tensile strength and a high elongation. This reaction has been found to be very sensitive to added substances, many of the other olefins being strongly poisonous to the reaction, including such substances as isobutylene dimer and various other higher unsaturates. Likewise, acid, alkali, aldehyde, ethereal and alcoholic substances have been found to be immediately destructive to the reaction to such an extent that it has been considered that the presence of oxygenated compounds of any kind is fatal to the reaction; even such substances as the aliphatic ethers being the cause of immediate cessation of the polymerization reaction.

The present invention presents a new high molecular weight heteropolymer and polymerization process involving the interpolymerization of an olefin, preferably a hydrocarbon olefin such as isobutylene or propylene, or the normal butylenes, or the amylenes; and, in addition, as desirable alternatives, such substances as alpha-methyl styrene and alpha-methyl paramethyl methyl styrene, indene, coumarone, and the like; with an olefinic ether containing two isolated ethylenic double bonds, by the application at low temperatures to the mixture of olefin and olefinic ether of a dissolved active metal halide catalyst, preferably below 0° C.

A suitable olefinic ether for the present reaction is dimethallyl ether, having the formula:

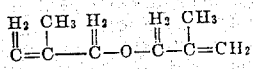

Alternatively, other diolefinic ethers such as methallyl-allyl ether

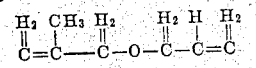

are usable in the polymerization reaction, still other ethers of higher molecular weight are similarly usable, including such substances as divinyl ether, vinyl methallyl ether, etc., which contain two double bonds as in alkadienes or diolefins.

Thus an object of the present invention is to prepare a heteropolymer of an isoolefin such as isobutylene with an olefinic ether such as dimethallyl ether or methallyl-allyl ether and their homologues to produce a new and useful heteropolymer. Other objects and details of the invention will be apparent from the following description.

In practicing this invention, an olefinic mixture is prepared consisting of the simple olefin, preferably isobutylene, with a diolefinic ether, the isoolefin being present in any desired proportion; but preferably the isoolefin is present in the ratio of from 60 to 99 parts with the diolefinic ether present in the proportion of 40 to 1 part. This olefinic mixture may be polymerized at the desired temperature as prepared, only the catalyst being added; but it is preferably diluted with a diluent-refrigerant such as liquid ethylene or liquid ethane or liquid methane or mixtures of one or more of these several diluent-refrigerants, together with other inert diluents such as liquid propane, liquid butane, liquid ethyl or methyl chlorides and the like, the diluent-refrigerant being present in the proportion of from 2 to 5 or 6 volumes per volume of mixed olefins. Alternatively, an excess of solid carbon dioxide may be utilized either with or without an auxiliary diluent such as propane, ethyl or methyl chloride or similar inert, low freezing substances.

The catalyst preferably consists of a solution of an active metal halide such as aluminum chloride, bromide or iodide or uranium or titanium chloride dissolved in a low freezing solvent such as ethyl or methyl chloride or carbon dioxide or similar homologous substances. Substantially any of the Friedel-Crafts catalysts as disclosed by N. O. Calloway in his article on "The Friedel-Crafts Synthesis," printed in the issue of "Chemical Reviews" published for the American Chemical Society at Baltimore in 1935 in volume XVIII, the article beginning on page 327, the list being particularly well shown on page 375, may be used. The simple halide compounds may be used or various forms of double salts such as the chlorobromide and the like may be used.

As the catalyst solvent, with the simple Fiedel-Crafts halides, the preferred solvent is a lower alkyl halide, such as ethyl or methyl chloride, the alkyl mono or poly halides up to 5 or 6 carbon atoms per molecule which have freezing points below about 0° C., thereby being low-freezing solvents, may be used. Alternatively, carbon disulfide in its various forms and homologs may also be used as catalyst solvents. With the modified or double salt Friedel-Crafts catalyst particularly, a considerable number of the lower hydrocarbons such as liquid propane, liquid butane and the like may be used as solvents, approximately 7 or 8 carbon atoms compounds being the upper limit.

The temperature of the reaction for the polymerization preferably lies between 0° C. and about −164° C.; and the most convenient temperatures are −78° C., as set by solid carbon dioxide, or −95 to −103° C., as set by liquid ethylene.

The catalyst solution may be applied to the reaction mixture in any desired manner. It may be poured in and stirred vigorously, providing the stirring equivalent is sufficiently powerful. It may be delivered into the rapidly stirred reaction mixture as a rapid stream, or by other methods which will be obvious; but the catalyst solution is preferably applied in the form of a spray or mist on to the surface of the rapidly stirred mixture of the olefins and diluent-refrigerant. The reaction proceeds rapidly to produce the desired solid, plastic, elastic polymer.

The resulting heteropolymer shows characteristics depending to a large extent upon the particular diolefinic ether utilized. A heteropolymer containing substantial proportions of dimethallyl ether reacts with sulfur, with difficulty and is strongly resistant to hydrocarbon solvents. The presence of substantial proportions of oxygen as introduced through the dimethallyl ether makes the material still more strongly resistant to solution in hydrocarbon solvents.

Example I

A mixture of 98 parts of liquid isobutylene was prepared with two parts of dimethallyl ether, and 4 volumes of liquid ethylene were added to the mixture. The mixture was prepared in a reactor equipped with a powerful stirring device and provided with a cover to avoid loss of volatilized gaseous constituents. The reactor also was well heat insulated to reduce the rate of volatilization of the refrigerant by ambient heat. The catalyst was prepared by dissolving commercial anhydrous aluminum chloride in methyl chloride at the boiling point of the methyl chloride to yield a saturated solution containing 0.9% of aluminum chloride. This solution was then diluted with an additional amount of methyl chloride to produce a solution containing 0.4% of dissolved aluminum chloride. This solution was then precooled to the temperature of the liquid ethylene, approximately −103° C., and sprayed on to the surface of the vigorously stirred mixed olefins through a misting nozzle. The polymerization proceeded rapidly and was approximately 80% complete in about 5 minutes.

When this stage of polymerization was reached, the polymerization mixture was diluted with approximately ½ volume of propyl alcohol or ethyl alcohol or ethyl ether or similar oxygenated hydrocarbon, to quench the catalyst and arrest polymerization. The solid polymer was then brought up to room temperature and was ready for further processing.

This material, as so polymerized, shows a molecular weight ranging from 10,000 to 100,000, depending upon the temperature of polymerization and the proportion of dimethallyl ether present. It is substantially insoluble in hydrocarbon solvents generally and shows only a nominal amount of swelling in the lower molecular weight hydrocarbon solvents. It is likewise insoluble in ether, alcohol or acetone, and in fact, most oxygenated solvents, although again it swells somewhat by absorption of these solvents. This particular polymer is poorly reactive with sulfur and does not undergo any curing reaction readily.

Example II

A similar polymerization reaction is found to occur with methallyl-allyl ether, using similar proportions of the isobutylene and methallyl-allyl ether and a similar polymerization procedure to that above disclosed in Example I. In this instance also, a high molecular weight polymer is produced which, however, differs from the polymer of Example I in being reactive with sulfur for a curing reaction to develop an elastic limit, a relatively high tensile strength and a high elongation, together with insolubility in both hydrocarbon and oxygenated solvents.

Example III

The heteropolymer of isobutylene and methallyl-allyl ether was then compounded according to the following formula:

| | Parts |
|---|---|
| Heteropolymer | 100 |
| Zinc oxide | 5 |
| Stearic acid | 3 |
| Sulfur | 3 |
| Tuads (tetramethyl thiuram disulfide) | 1 |

In preparing this compound, the heteropolymer was worked briefly upon the mill for a time interval of approximately 5 minutes. Then the zinc oxide was added and thoroughly incorporated into the polymer by further working on the mill. Thereafter, the stearic acid and sulfur were simultaneously added, the mill temperature during this portion of the operation being maintained at approximately 125° C. When these ingredients were thoroughly incorporated, the mill was cooled to a temperature of approximately 90° C. and the Tuads added quickly, the compound removed from the mill and cooled.

This prepared compound was then placed in a mold and cured at a temperature of 155° C. for 60 minutes to produce the desired cured rubber-like polymer.

Example 4

A mixture was prepared consisting of 970 parts by weight of isobutylene, 30 parts by weight of divinyl ether and 2000 parts by weight of methyl chloride. This material was cooled to a temperature of approximately −78° C. by the addition of 4000 parts by weight of polymerized solid carbon dioxide. The material was well stirred and when the temperature had been lowered to the desired point, a steady, moderately rapid stream of gaseous boron trifluoride was bubbled through the cold olefinic liquid. The boron trifluoride polymerized the mixture to yield a solid polymer having a molecular weight well above 1000. When the reaction was nearly complete, the reaction mixture was dumped into a large excess of warm water and the polymer separated. Upon analysis, the polymer was found to contain approximately 12% of copolymerized divinyl ether. The material showed a good solubility in oil and in light naphtha solvents and when dissolved in a good lubricating oil, produced a substantial improvement in the viscosity index thereof.

Example V

A mixture was prepared consisting of 500 parts of isobutylene and 500 parts of divinyl ether. To this mixture there were then added 2000 parts of methyl chloride and the material was cooled to a temperature of approximately $-78°$ C. by the addition of 4000 parts by weight of pulverized solid carbon dioxide. As in Example IV, the polymerization was conducted by bubbling a stream of gaseous boron trifluoride through the olefinic material. The polymerization proceeded rapidly to yield a hard polymer which was insoluble in hydrocarbons generally but thermoplastic and suitable for molding operations. The material showed a much greater toughness, and a lower brittleness than is characteristic of polyvinyl ether, and an absence of the cold flow which is characteristic of simple polyisobutylene.

Example VI

A mixture was prepared consisting of 900 parts by weight of styrene, 100 parts by weight of divinyl ether and 2000 parts by weight of methyl chloride. This mixture was placed in a reactor jacketed with liquid ethylene and cooled to a temperature of approximately $-100°$ C. When this temperature was reached, approximately 2000 parts by weight of a 0.5% solution of aluminum chloride in ethyl chloride were added with rapid stirring of the cold olefinic mixture. This procedure yielded a solid polymer which was found to be soluble in hydrocarbons, thermoplastic and excellent for pressure molding.

Many other simple olefins such as propylene, which contains 3 carbon atoms per molecule, the various normal butylenes, the amylenes and various of the higher olefins up to about 8 carbon atoms per molecule are similarly reactive with the olefinic ether.

Thus the invention provides a new and useful heteropolymer of an olefin with a diolefinic ether in which relatively high insolubility in solvents generally is obtained, together with sulfurizability, high strength, high elongation and so forth.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. A heteropolymer comprising in combination 50 to 98 parts by weight of an olefin having 3 to 5 carbon atoms and one ethylenic double bond per molecule with 2 to 50 parts by weight of an ether having 4 to 8 carbon atoms and two isolated ethylenic double bonds per molecule, the ether having an oxygen link between hydrocarbon groups containing each of the two isolated ethylenic double bonds.

2. A heteropolymer comprising in combination 98 parts by weight of isobutylene with 2 parts by weight of an ether having an oxygen link between a methallyl group and a hydrocarbon group containing 3 to 4 carbon atoms and one ethylenic double bond.

3. A heteropolymer comprising in combination 98 parts by weight of isobutylene with 2 parts by weight of dimethallyl ether.

4. A heteropolymer comprising in combination 98 parts by weight of isobutylene with 2 parts by weight of methallyl-allyl ether.

5. A heteropolymer comprising in combination 50 parts by weight of isobutylene with 50 parts by weight of divinyl ether.

6. A composition of matter comprising in combination with sulfur a sulfurizable heteropolymer of 98 parts by weight of isobutylene combined with 2 parts by weight of methallyl-allyl ether.

7. A polymerization process comprising the steps in combination of mixing 50 to 98 parts by weight of a mono-olefin having 3 to 5 carbon atoms per molecule with 50 to 2 parts by weight of an ether having 4 to 8 carbon atoms and two isolated ethylenic double bonds per molecule, the ether having an oxygen link between hydrocarbon groups containing each of the two isolated ethylenic double bonds, cooling the mixture of the monoolefin and the ether to a polymerization temperature between $0°$ C. and $-164°$ C., and effecting polymerization of the resulting mixture by adding thereto a Friedel-Crafts catalyst dissolved in an inert organic solvent which is liquid at the polymerization temperature.

8. A polymerization process comprising the steps in combination of mixing 98 parts by weight of isobutylene with 2 parts by weight of an ether having an oxygen link between a methallyl group and a hydrocarbon group containing 3 to 4 carbon atoms and one ethylenic double bond, cooling the isobutylene mixed with the ether in the presence of liquid ethylene at a polymerization temperature within the range $-95°$ C. to $-103°$ C., and effecting polymerization of the isobutylene with the ether in the resulting cooled mixture by adding thereto aluminum chloride in an alkyl halide solvent which is liquid at the polymerization temperature.

WILLIAM J. SPARKS.
ROBERT M. THOMAS.